United States Patent
Smith

(10) Patent No.: US 12,509,890 B2
(45) Date of Patent: Dec. 30, 2025

(54) LUMBER TORQUE TOOLS AND METHODS

(71) Applicant: Paul George Smith, Rapid River, MI (US)

(72) Inventor: Paul George Smith, Rapid River, MI (US)

( * ) Notice: Subject to any disclaimer, the term of this patent is extended or adjusted under 35 U.S.C. 154(b) by 458 days.

(21) Appl. No.: 17/580,318

(22) Filed: Jan. 20, 2022

(65) Prior Publication Data

US 2022/0234243 A1 Jul. 28, 2022

Related U.S. Application Data

(60) Provisional application No. 63/142,468, filed on Jan. 27, 2021.

(51) Int. Cl.
| | | |
|---|---|---|
| *E04F 21/22* | (2006.01) | |
| *B27M 1/00* | (2006.01) | |
| *E04F 15/02* | (2006.01) | |

(52) U.S. Cl.
CPC ............... *E04F 21/22* (2013.01); *B27M 1/00* (2013.01); *E04F 15/02183* (2013.01)

(58) Field of Classification Search
CPC .................................. B27H 1/00; E04F 21/22
See application file for complete search history.

(56) References Cited

U.S. PATENT DOCUMENTS

| | | | |
|---|---|---|---|
| 7,213,979 B2 * | 5/2007 | Park ..................... | G02B 6/4292 |
| | | | 385/136 |
| 10,526,801 B2 | 1/2020 | Pelc | |
| 2005/0247019 A1 * | 11/2005 | Pasto ..................... | E04F 21/22 |
| | | | 52/749.12 |

OTHER PUBLICATIONS

Cepco Tool Company Website. "BoWrench Decking Tool". Published at least as early as Dec. 5, 2020.
Decsgo. Website, published at least as early as Dec. 4, 2020. Bowjak Board Straightener.
Mayhew Select Pry Bars website. "Pry Bars, Board Bender" device. Published at least as early as Dec. 5, 2020.
Stanley Tools website. "Stanley Board Bender Deck Tool". Published at least as early as Dec. 5, 2020.
Stanley Tools Website. Published at least as early as Dec. 5, 2020. "Stanley Fatmax Fubar Utility Bar".

* cited by examiner

*Primary Examiner* — Matthew Katcoff
(74) *Attorney, Agent, or Firm* — DEVICE PATENT LLC

(57) ABSTRACT

Disclosed herein is a lumber torque tool used for straightening of warped lumber during the fabrication of wood frame assemblies. This warpage is known as crook and twist. The lumber torque tool comprises: an elongate lever arm comprising an inner lever face, an alignment plate comprising a medial face facing and spaced from the inner lever face, and a torque link extending and fixed between the medial face and the inner lever face. The inner lever face, the medial face and the torque link define a proximally facing U-shaped proximal lock pocket and a U-shaped distal lock pocket at a distal end of the lumber torque tool for engaging lumber therein during the application of forces to the lumber. Methods for using the lumber torque tool to remove twist and crook are described.

12 Claims, 7 Drawing Sheets

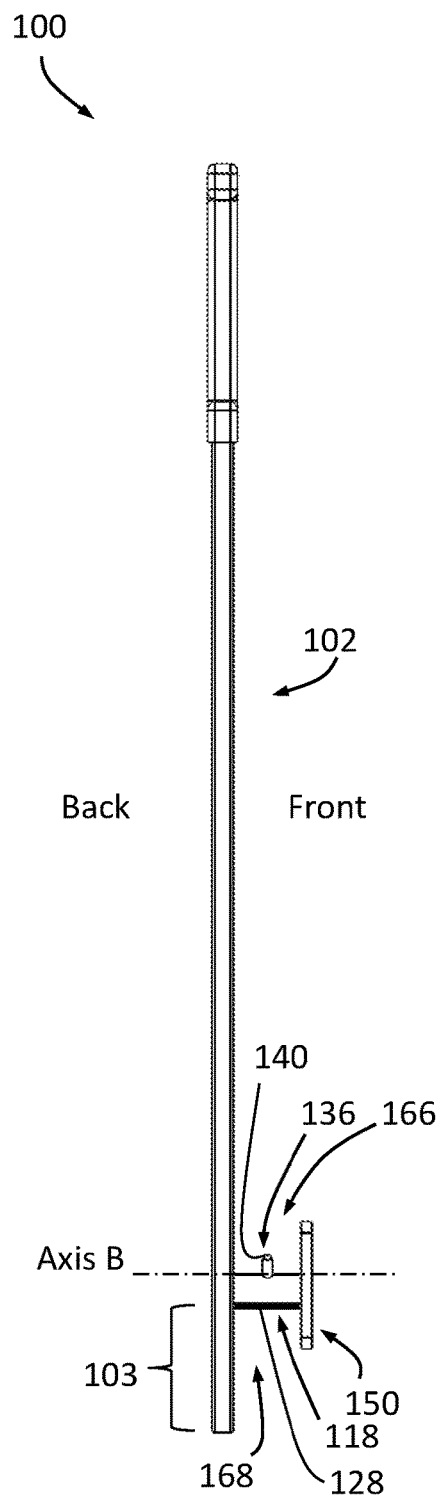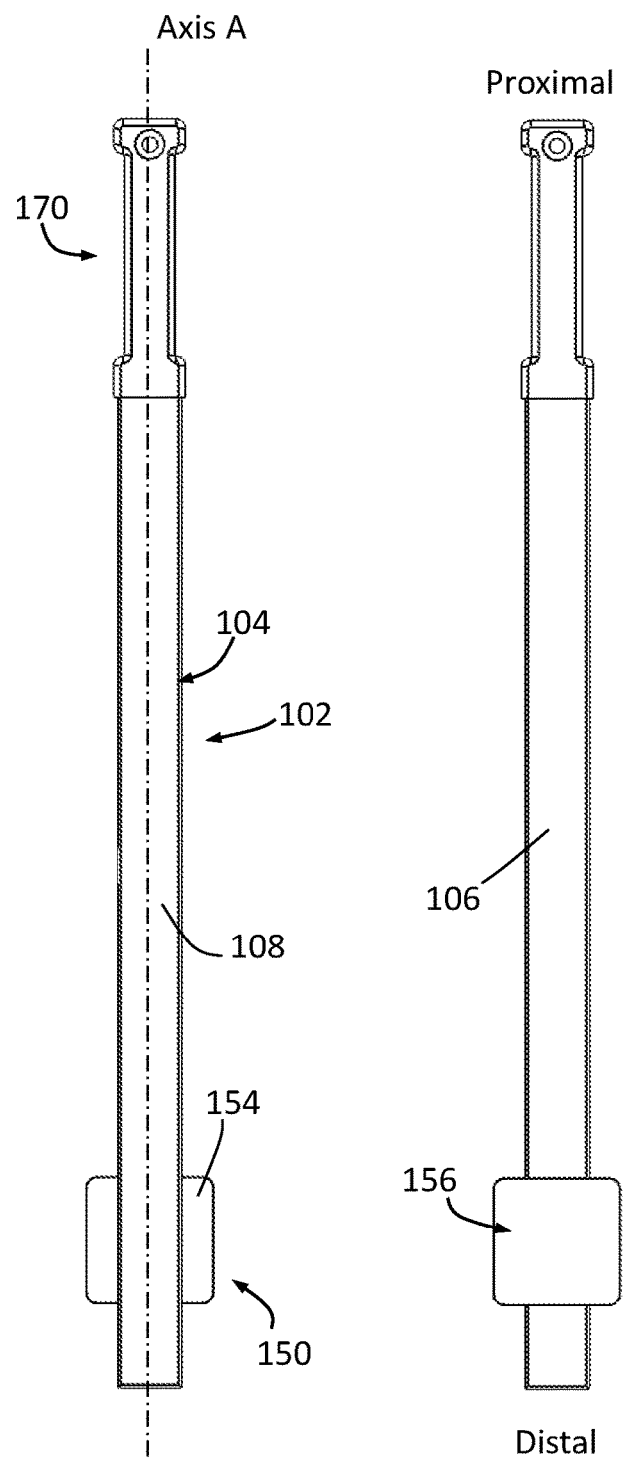
FIGURE 1  FIGURE 2  FIGURE 3

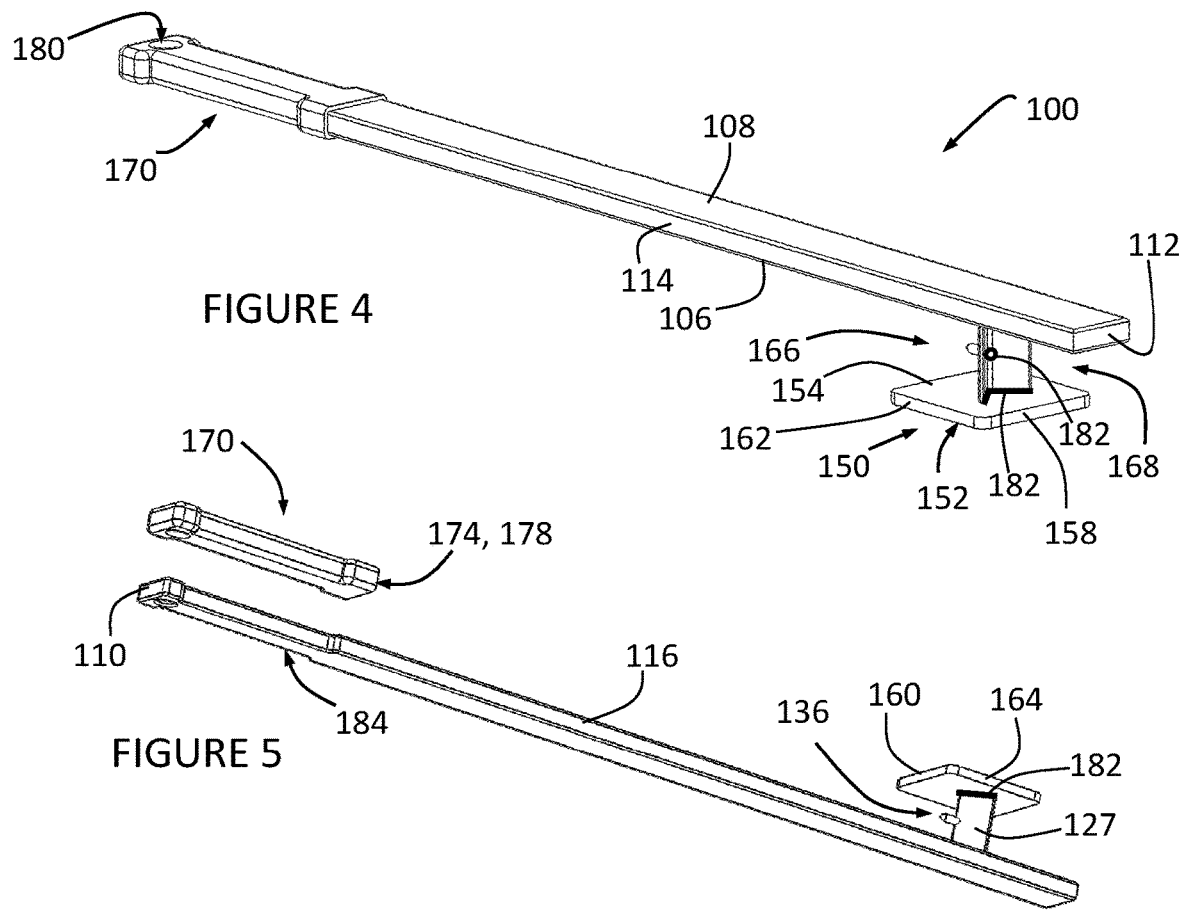
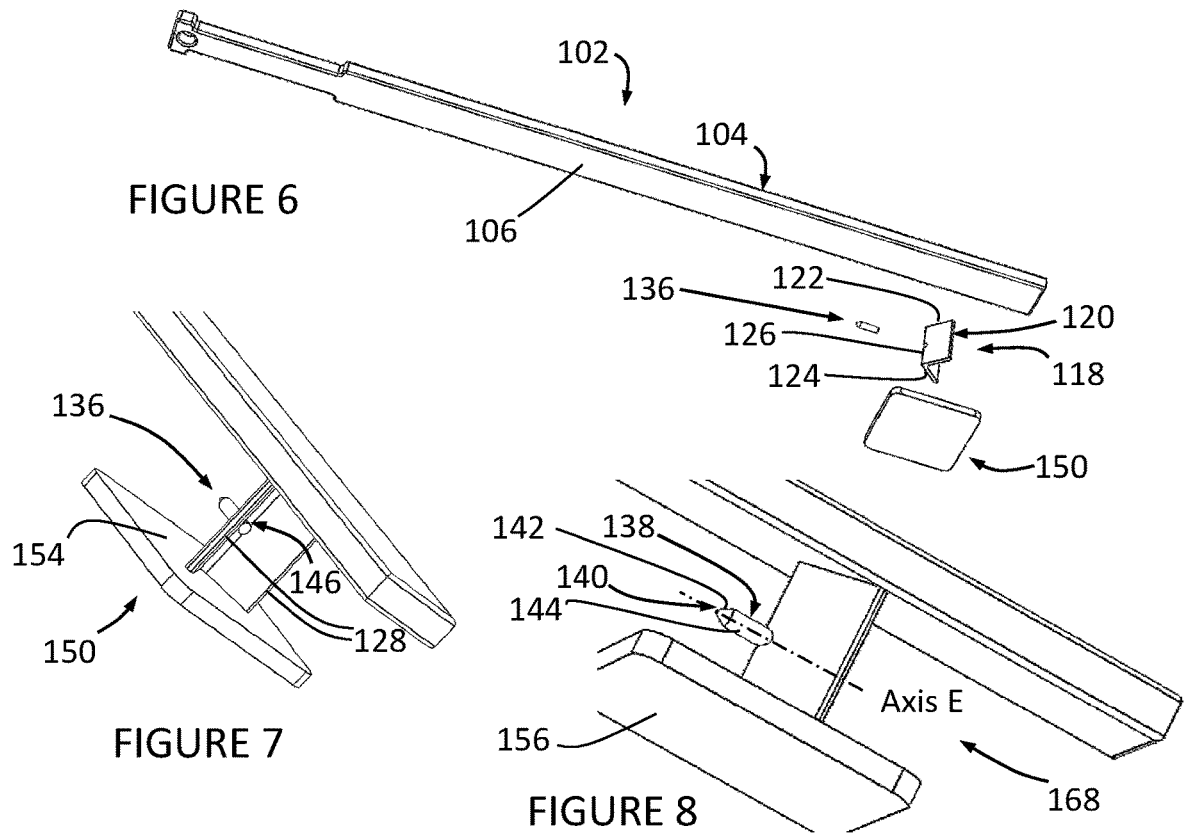

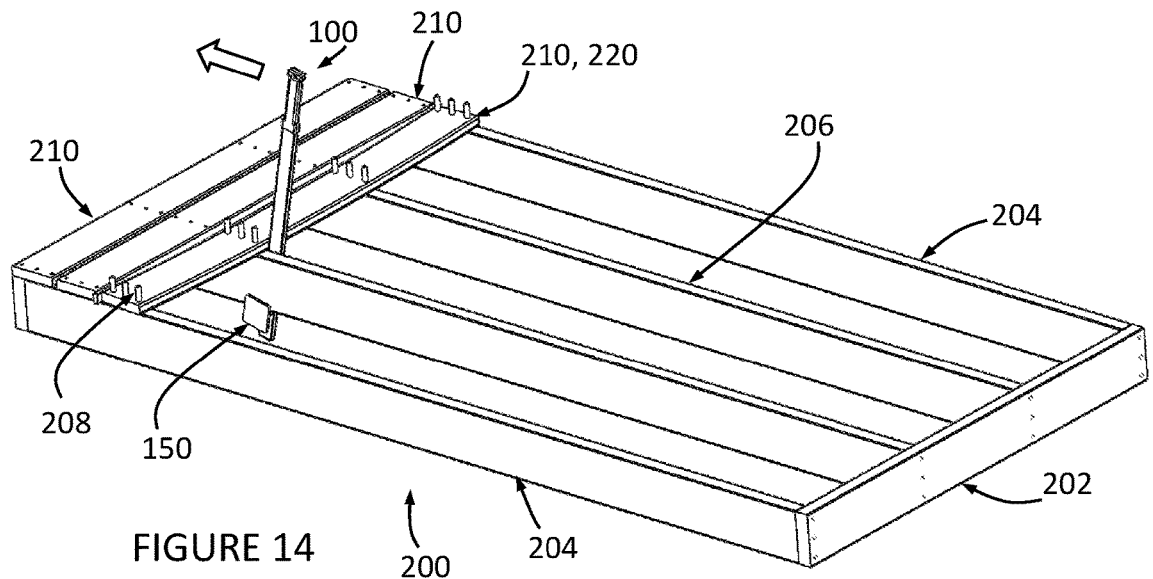
FIGURE 14
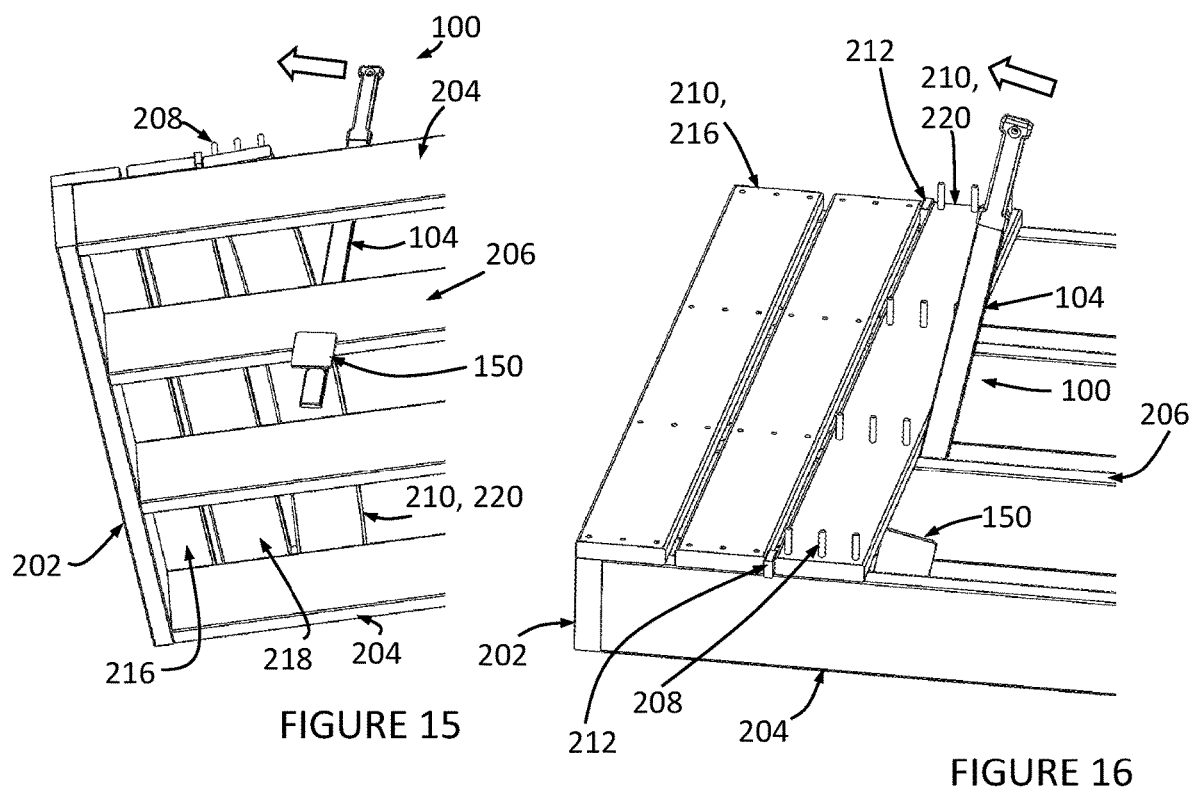
FIGURE 15
FIGURE 16

LUMBER TORQUE TOOLS AND METHODS

CROSS REFERENCE TO RELATED APPLICATIONS

This application claims priority to Provisional Patent Application No. 63/142,468 filed Jan. 27, 2021, the entire disclosure of which is hereby incorporated by reference and relied upon.

BACKGROUND OF THE INVENTION

Field of the Invention

The invention relates generally to tools used to build wood structures, and more particularly to tools for straightening warped lumber including decking before fastening with screws or nails. This warpage in lumber is known as crook and twist. When joints are secured at one end, sometimes twist throws it out of alignment at an opposite end. Similarly, crook can disrupt alignment in the middle section of lumber.

SUMMARY OF THE INVENTION

Disclosed herein are carpentry tools and their methods of use that are designed to subdue warpage in lumber.

In one form, a lumber torque tool is utilized to straighten lumber.

In one form, the lumber torque tool requires only one hand for operation.

In one form, the lumber torque tool eliminates the need for assistance and saves time.

In one form, the lumber torque tool is sized for use with "2×" lumber such as 2×4's and 2×6's and 2×8's and 2×12's, although the lumber torque tool can be modified for other size lumber.

In one form, the lumber torque tool is constructed substantially of metals such as steels, steel alloys, and aluminum.

In one form, a lumber torque tool comprises a lever arm formed from an elongate lever arm body.

In one form, the lever arm body comprises a proximal face on a proximal end and a distal face on a distal end.

In one form, the lever arm body extends along an Axis A.

In one form, the lever arm body has a cross-sectional profile that is substantially rectangular.

In one form, the elongate lever arm body comprises a substantially planar or flat inner lever face and a substantially planar outer lever face. A first lateral face and an opposed second lateral face extend between the inner lever face and outer lever face.

In one form, the inner lever face and the outer lever face are longer than the first lateral face and second lateral face.

In one form, the proximal end of the elongate lever arm body comprises one or more grip recess in the form of a recess in the first and/or second lateral faces.

In one form, a handle covers the proximal end of the elongate lever arm body.

In one form, the handle is constructed of a polymer.

In one form, the handle is seated in the one or more grip recesses.

In one form, the handle comprises an inner handle surface defining a handle cavity operable for seating the proximal end of the elongate lever arm body therein.

In one form, a handle window extends through the handle and the lever arm body at a proximal end and is sized and shaped for receiving a support element such as a nail or a tie.

In one form, the lumber torque tool comprises a torque link.

In one form, the torque link comprises a torque link body.

In one form, the torque link body is in the form of an elongate angle.

In one form, the torque link body comprises a first end surface at one end, and an opposing second end surface at an opposing end.

In one form, a proximal edge on the torque link faces proximally extending from the first end surface to the second end surface.

In one form, one or more distal surfaces on the torque link face distally and extend from the first end surface to the second end surface.

In one form, the first end surface is secured to the inner lever face of the lever arm.

In one form, welds are utilized to fix component together in the lumber torque tool.

In one form, the second end surface is secured to a medial face of an alignment plate.

In one form, a lumber torque tool comprises a spur operable for plunging into a side of a joist.

In one form, the spur extends from the proximal edge of the torque link along a proximal axis E.

In one form, axis E is substantially parallel to axis A.

In one form, the spur comprises a substantially cylindrical spur body defined by a spur outer surface.

In one form, the proximal end of the spur has a tapered spur face terminating in a spur point substantially centered between the first end surface and second end surface.

In one form, the alignment plate comprises an alignment plate body having a substantially broad and flat medial face and an opposed lateral face.

In one form, the alignment plate is substantially square or rectangular.

In one form, corners of the alignment plate are filleted.

In one form, the alignment plate is substantially square and joining the flat medial face and opposed lateral face is a distal facet facing distally, a proximal facet facing proximally, a first lateral facet facing laterally with an opposed second lateral facet also facing laterally.

In one form, the inner lever face, proximal edge, and medial face define a proximal torque pocket.

In one form, the proximal torque pocket is U-shaped.

In one form, the inner lever face, the distal surface, and medial face define a distal torque pocket.

In one form, the distal torque pocket is U-shaped.

In one form, a wood frame assembly can contain joists, studs, or both joists and studs.

In one form, a twisted joist or stud in a wood frame assembly is straightened by plunging a spur from a lumber torque tool into the underside of a joist thereby cupping the bottom face of the joist in the proximal torque pocket. Then applying a counter force to the handle in a direction that removes the twist and into the desired alignment. Then securing the untwisted board with fasteners through a rim joist or joist hanger.

In one form, fasteners herein include bolts, screws, and nails and other such devices known in the art.

In one form, a twisted joist or stud of a wood frame assembly is straightened by cupping the top face of the joist in the distal torque pocket and applying a counter force to the handle in a direction that removes the twist, then securing the joist or stud with fasteners through a rim joist or joist hanger.

In one form, the lumber torque tool eliminates crook in deck boards by plunging the fulcrum spur into the underside of the joist and pulling the warped deck member into the desired alignment with the adjacent deck member using the lever arm and then fastening it.

BRIEF DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments shown and described herein, and wherein:

FIG. 1 depicts a side view of a lumber torque tool in an operable configuration ready for use;

FIG. 2 depicts a back view of the lumber torque tool of FIG. 1;

FIG. 3 depicts a front view of the lumber torque tool of FIG. 1;

FIG. 4 depicts a perspective view of the lumber torque tool of FIG. 1;

FIG. 5 depicts an opposed perspective view of the lumber torque tool of FIG. 1 with handle removed;

FIG. 6 depicts an exploded view of the lumber torque tool of FIG. 1;

FIG. 7 depicts a close-up perspective view of the distal end of the lumber torque tool of FIG. 1;

FIG. 8 depicts a close-up side perspective view of the lumber torque tool of FIG. 1;

FIG. 14 depicts a top perspective view of a lumber torque tool engaging a joist to remove crook in decking;

FIG. 15 depicts a bottom perspective view of a lumber torque tool engaging a joist to remove crook in decking;

FIG. 16 depicts another top perspective view of a lumber torque tool engaging a joist to remove crook in decking.

DETAILED DESCRIPTION OF SELECTED EMBODIMENTS OF THE INVENTION

Figure 9:
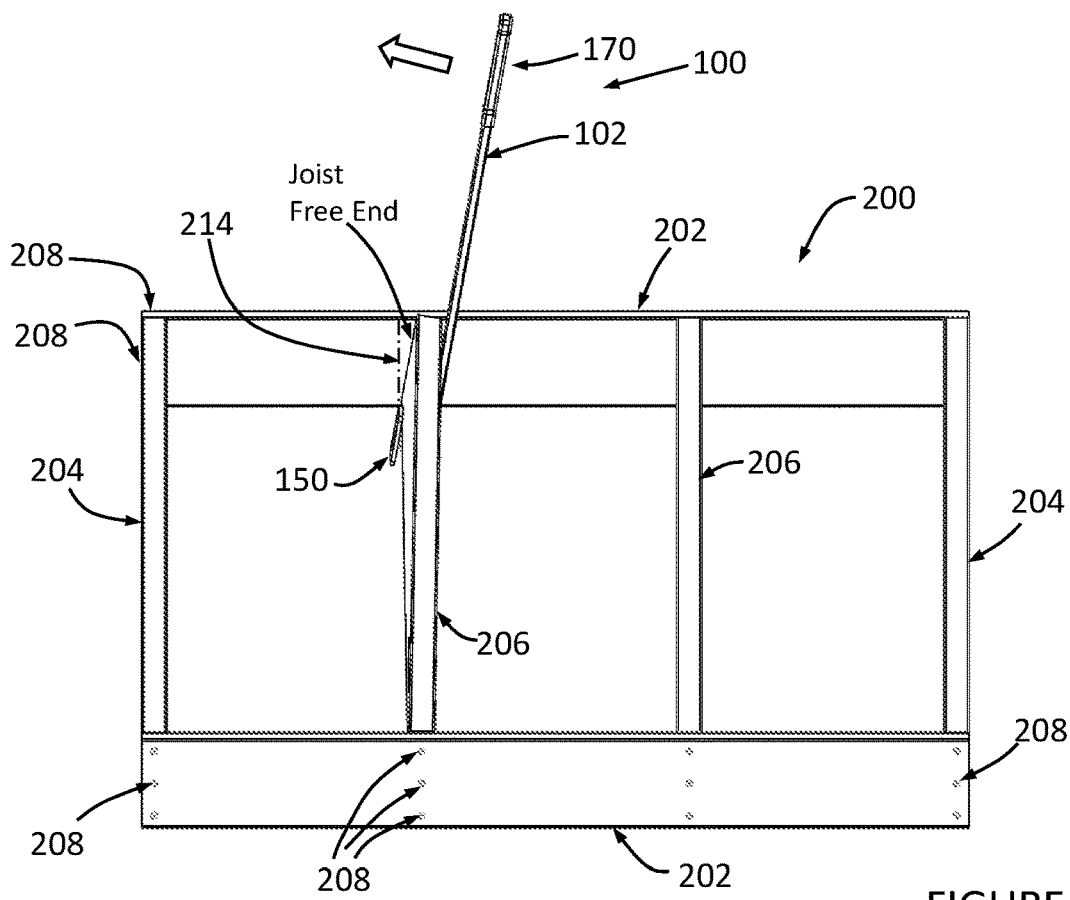
FIG. 9 depicts a top perspective view of a lumber torque tool engaged with the end of a warped joist.

Select embodiments of the invention will now be described with reference to the Figures. Like numerals indicate like or corresponding elements throughout the several views and wherein various embodiments are separated by letters (i.e. 100, 100B, 100C). The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Disclosed herein are carpentry tools and their methods of use that are designed to subdue warpage in lumber.

FIGS. 1-8 illustrate a variety of front, back, side, and perspective views of a preferred embodiment of a lumber torque tool utilized to straighten lumber during the construction of a wood frame assembly such as a deck. The lumber torque tool 100 comprises a lever arm 102 operable to create torque in the tool by hand force. The lumber torque tool 100 is formed from an elongate lever arm body 104 as illustrated in FIG. 2 along axis A. The lever arm body 104 comprises a proximal face 110 facing proximally on a proximal end and a distal face 112 facing distally on a distal end. The elongate lever arm body 104 comprises a substantially planar and/or flat inner lever face 106 and a substantially planar outer lever face 108. A first lateral face 114 and an opposed second lateral face 116 extend between the inner lever face 106 and outer lever face 108. The lever arm body 104 is substantially rectangular in cross-section, however it is recognized that other cross-sectional shapes can be used without disrupting the intent or function of the invention. The outer lever face and inner lever faces make up the longer faces of the rectangular cross-section.

The proximal end of the elongate lever arm body 104 comprises one or more grip recess 184 in the form of a recess in one or more of the first lateral face 114 and second lateral face 116. A handle 170 covers the proximal end of the elongate lever arm body 104. The handle is seated in the one or more grip recess 184. Handle 170 comprises an inner handle surface 174 defining a handle cavity 178 operable for seating the proximal end of the elongate lever arm body 104 therein. When present, a handle window 180 extends through the handle 170 and the lever arm body 104 at a proximal end.

As also illustrated in the Figures according to one embodiment, the lumber torque tool 100 comprises a torque link 118 comprising a torque link body 120. The torque link body 120 is in the form of an elongate angle having a first end surface 122 at one end, and an opposing second end surface 124 at an opposing end. A proximal edge 126 on the torque link 118 faces proximally and extends from the first end surface to the second end surface. In addition, one or more distal surfaces 128 on the torque link face distally and extend from the first end surface 122 to the second end surface 124. The first end surface 122 is secured to the inner lever face 106 of the lever arm 102 whereas, the second end surface 124 is secured to a medial face 154 of an alignment plate 150.

As best illustrated in FIG. 8, lumber torque tool 100 comprises a spur 136 operable for plunging into an edge of a joist or stud during construction of a wood frame assembly. As illustrated, the spur 136 extends proximally and generally perpendicular to and from the torque link body 120 from the proximal edge 126 of torque link 118. In this embodiment, spur 136 comprises a substantially cylindrical spur body 138 defined by a spur outer surface 144 and the proximal end of the spur 136 has a tapered spur face 142 terminating in a spur point 140. The spur 136 is preferably centered between first end surface 122 and second end surface 124. Although angled, it is recognized that the torque link 118 can assume other cross-sectional profiles such as square and continue to be operable. Similarly, although having a cylindrical body in this embodiment, it is recognized that the spur 136 can assume other cross-sectional profiles and remain functional. As illustrated in FIG. 7, spur 136 can be seated in a spur hole 146 extending through the torque link from a proximal edge 126 and welded into position. Welds, fasteners, and other well know approaches in the art can be used to secure the various parts of the lumber torque tool together.

As noted in FIG. 4 and other Figures, alignment plate 150 comprises an alignment plate body 152 having a substantially broad and flat medial face 154 and an opposed lateral face 156. The alignment plate 150 in this embodiment is substantially square (although other shapes can be used) with rounded corners. Joining the flat medial face and opposed lateral face is a distal facet 158 facing distally, a proximal facet 160 facing proximally, a first lateral facet 162 facing laterally with an opposed second lateral facet 164 also facing laterally.

As further illustrated in FIG. 4, the inner lever face 106, proximal edge 126, and medial face 154 define a substantially U-shaped proximal torque pocket 166 operable for coupling around and applying torque to a board. The inner lever face 106, the distal surface 128, and medial face 154 define a substantially U-shaped distal torque pocket 168 operable for coupling around and applying torque to a board. Distal leg 103 of lever arm 102 extends distally past torque link 118, and as depicted in FIG. 1, the length of distal leg 103 exceeds the length of distal surface 128 of torque link 118. In preferred embodiments, the medial face and inner lever face are spaced at least 1.5 inches.

Figure 10:
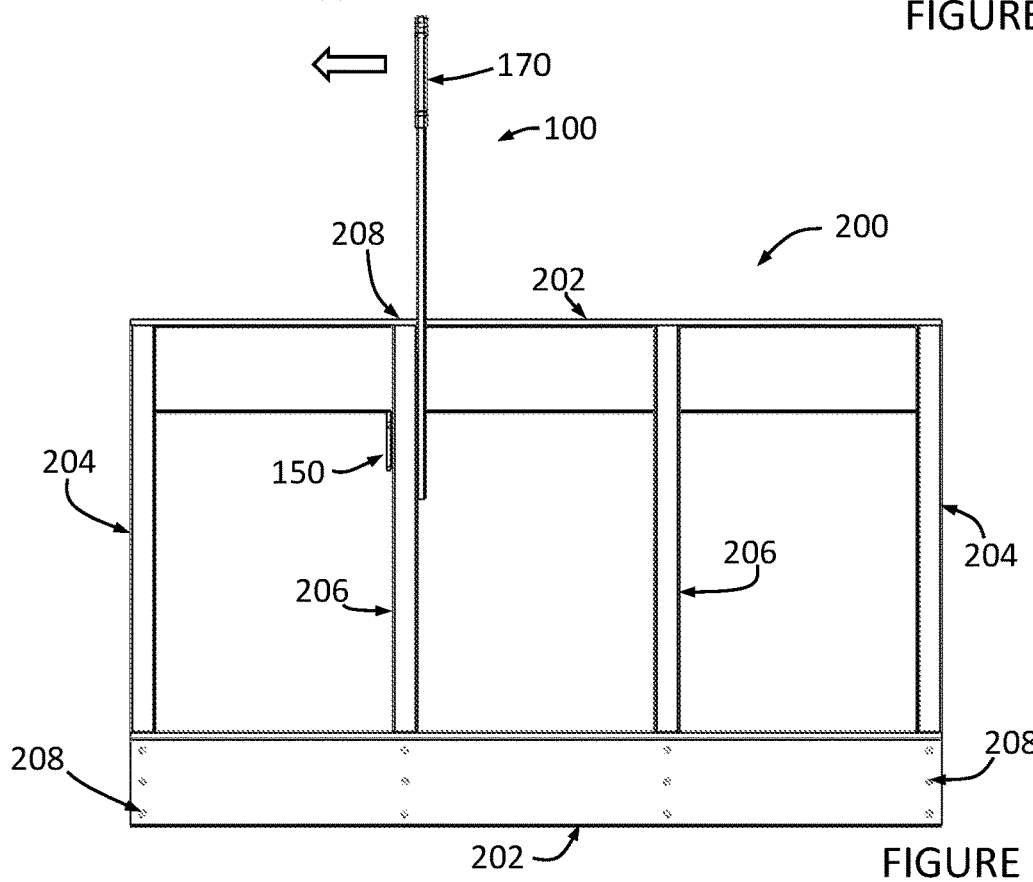
FIG. 10 depicts a top perspective view of the lumber torque tool of FIG. 9 after a force has been applied to the lumber torque tool thereby removing the warpage from the joist.
Figure 11:
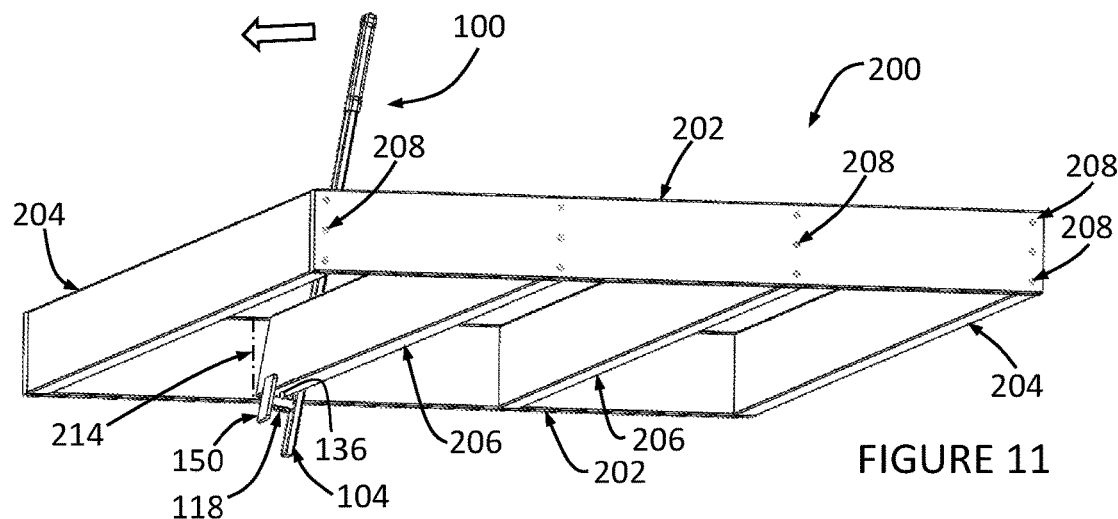
FIG. 11 depicts a bottom perspective view of the lumber torque tool engaging the bottom of the joist or stud in a proximal torque pocket of the tool.
Figure 12:
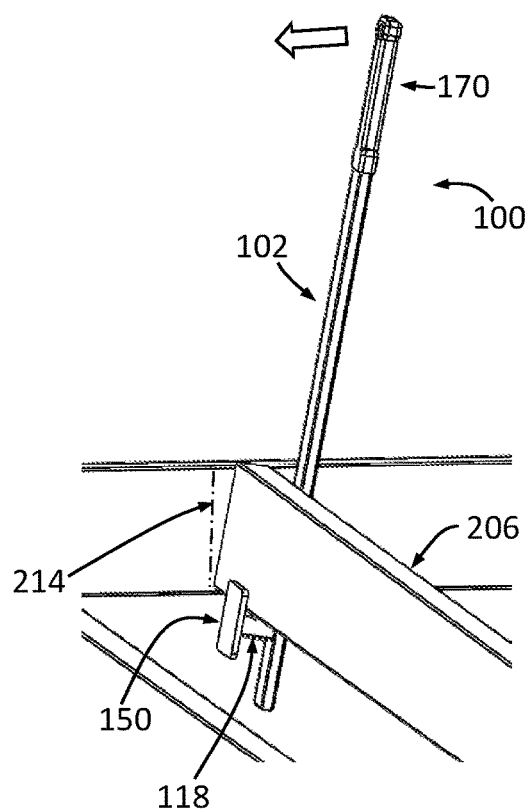
FIG. 12 depicts a close-up perspective view of the spur of the lumber torque tool engaging the surface of the joist.
Figure 17:
FIG. 17 depicts a flow diagram of a method for removing joist twist using a lumber torque tool.
Figure 18:
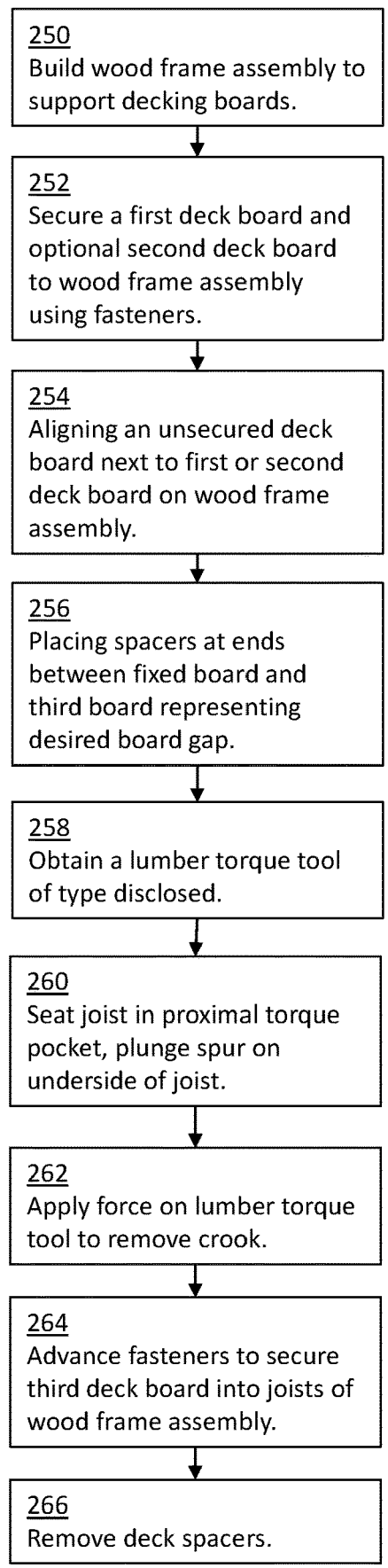
FIG. 18 depicts a flow diagram of a method for reducing crook in a decking board using a lumber torque tool.

One embodiment of a method of use of a lumber torque tool 100 is illustrated in FIGS. 9-12 during the building of a wood frame assembly 200. The flow diagram in FIG. 17 also illustrates this method in greater detail. The method is directed to wood frame assemblies whereas the term 'joist' can refer to both joists and studs. The wood frame assembly illustrated in FIG. 9 is used as an example, however the lumber torque tool can be used in wood frames having countless variations. In a first step, assembly of a wood frame is initiated (228). The wood frame assembly 200 of FIG. 9 comprises a series of spaced joists including outer joists 204 and inner joists 206 which are secured on the ends by a rim joist 202 and further secured with fasteners 208 extending through the rim joist 202 and into the outer joists or inner joists or secured in straightened orientation using a joist hanger. In this embodiment, a first end of the joist is aligned with a rim joist 202 and secured in position with fasteners 208 or a joist hanger (230). The free end (unsecured) of the twisted joist is secured with one fastener in the desired position (232). A lumber torque tool as described herein is obtained (234). The location of the twisted joist is evaluated to determine if adequate clearance is available below the joist to engage the unsecured end of the joist within the proximal torque pocket 166 of the lumber torque tool 100. If the clearance is sufficient, the lumber torque tool 100 is positioned such that the targeted joist is seated in the proximal torque pocket 166, and optionally the spur 136 of the lumber torque tool 100 is plunged on the underside of the joist as illustrated in FIGS. 9, 12 (236). A force is applied to the lever arm 102 in a direction that reverses the twist as illustrated in FIG. 10 (240) to align the joist 206 with the plum line 214 marked on the rim joist 202 (joist header) where it is held in an un-twisted position. The remaining fasteners 208 extending through the rim joist 202 adjacent the unsecured end of the un-twisted joist are then advanced (242) to hold the joist untwisted in the wood frame assembly 200 or optionally, a joist hanger is utilized to secure the joist in the un-twisted position.

Figure 13:
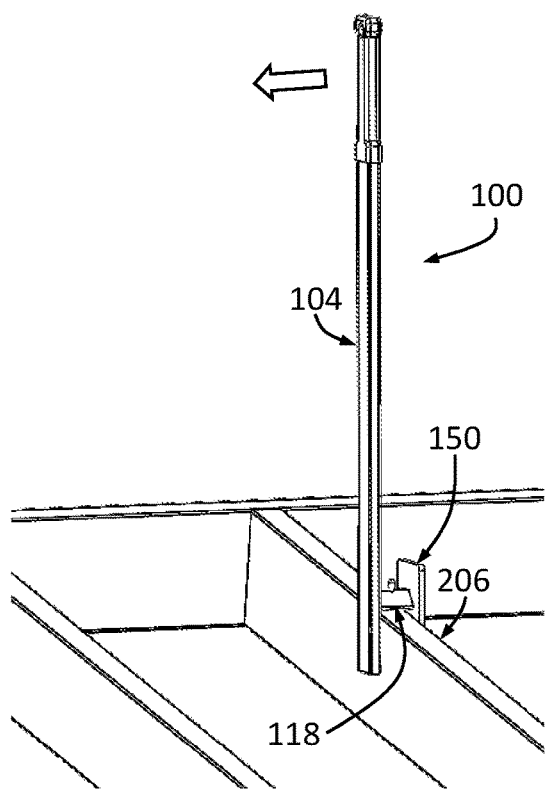
FIG. 13 depicts a close-up perspective view of the lumber torque tool engaging a warped joist from a top surface of a joist in the distal torque pocket of the tool.

The distal torque pocket 168 of the lumber torque tool 100 can be utilized when the distal edge of a twisted joist cannot be seated in the proximal torque pocket 166 due to limited access as evaluated at step (236). This may occur for example when building a wall unit or other wood frame assembly (228) on a deck, or driveway, or when there is otherwise insufficient ground clearance between the distal edge of the joist and the ground. The torque required to un-twist the joist or stud is then applied from the top of the joist 206 as illustrated in FIG. 13. One end of the joist 206 or stud is aligned and then secured into position at the rim joist 202 (230). The free, unsecured end is then aligned and secured with one fastener (232). The twisted framing member is then straightened by cupping the top face of the joist/stud in the distal torque pocket (238) and applying a counter force to the handle in a direction that un-twists the member into alignment with the intended plum line (240). The un-twisted framing member is then secured with screws or nails through the rim joist 202 (joist header) or with a joist hanger (242).

FIGS. 14-16 illustrates the method of using a lumber torque tool 100 to eliminate crook in decking. As noted in the Figures, deck boards 210 (first deck board 216, second deck board 218) are being secured to the top surfaces of joists 206, outer joists 204, and rim joists 202 during construction of a wood frame assembly 200 to support decking. As evidenced by the curve in the board, the third deck board 220 is illustrated with crook warpage prior to being fastened into position. Note, the fasteners 208 are positioned and have yet to be sunk. In this method, one or more deck boards 210 such as a first deck board 216 and second deck board 218 are fixed to the wood frame assembly as illustrated using fasteners 208. A third deck board 220 is then placed adjacent one of the fixed deck boards on the wood frame assembly (254). Deck spacers 212 are temporarily placed between the warped board and the fixed (secured) board adjacent to it (256). The spacers have a thickness representative of the width of gap desired between the deck boards. A lumber torque tool as disclosed herein is obtained (258). The lumber torque tool 100 is then positioned with the bottom of a joist 206 seated in proximal torque pocket 166 and with spur 136 plunged into the underside of the joist (260). A counter force is then applied to the handle 170 with the first lateral face 114 or second lateral face 116 driving the warped third deck board 220 into the desired alignment with the adjacent deck member using the lever arm thereby removing crook (262). The fasteners 208 are then advanced into position to hold the deck board 210 in place (264). The deck spacers 212 can then be removed (266).

It is noted that the terms "substantially" and "about" and "generally" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A tool for straightening warpage in lumber comprising:
an elongate lever arm operable to apply hand forces at a proximal end of said elongate lever arm and transmit said forces on a portion of lumber at a distal end of said lever arm;
said elongate lever arm comprising an inner lever face;
an alignment plate;
said alignment plate comprising a medial face facing and spaced from said inner lever face;
a torque link;
said torque link having a proximally facing proximal edge;
said torque link having a distal surface facing distally;
said torque link extending between said medial face and said inner lever face;
a distal leg of said elongate lever arm extending distally past said torque link;
said distal leg having a length exceeding the length of said distal surface of said torque link;
said inner lever face, said medial face, and said proximal edge define a U-shaped proximal torque pocket that opens proximally and is operable to seat a portion of lumber therein and apply torque to induce straightening of said lumber using said elongate lever arm; and,
wherein said inner lever face, said medial face, and said distal surface define a U-shaped distal torque pocket that opens distally and is operable to seat a portion of lumber therein and apply torque to induce straightening of said lumber using said elongate lever arm.

2. The tool of claim 1 further comprising:
a spur;
said spur extending proximally from said proximal edge.

3. The tool of claim 2 further comprising:
said spur having a central axis;
said lever arm having a central axis;
whereas said central axis of said spur and said central axis of said lever arm are substantially parallel.

4. The tool of claim 2 further comprising:
whereby said spur is substantially centered between said medial face and said inner lever face.

5. The tool of claim 1 further comprising:
a spur hole;
a spur;
said spur hole extending through said proximal edge;
said spur fixed in said spur hole.

6. The tool of claim 1 further comprising:
a grip recess at a proximal end of said elongate lever arm;
a handle;
whereby said grip recess is seated in said handle in an operable configuration.

7. The tool of claim 1 further comprising:
one or more welds;
said one or more welds bridging said torque link and said lever arm for fixation therebetween; and,
said one or more welds bridging said torque link and said alignment plate for fixation therebetween.

8. The tool of claim 1 whereas said lever arm extends distally past said torque link to form a distal leg of said lever arm.

9. The tool of claim 1 whereas said alignment plate extends proximally past said torque link and whereas said alignment plate extends distally past said torque link.

10. The tool of claim 1 whereas said inner lever face and said medial face are substantially flat.

11. The tool of claim 1 wherein said torque link comprises a pair of elongate flats angled from each other at 90 degrees and joined along a common edge.

12. A tool for straightening warpage in lumber comprising:
an elongate lever arm;
said elongate lever arm having a handle at a proximal end operable to apply hand forces to transmit said hand forces on a portion of lumber engaged at a distal end of said lever arm;
said elongate lever arm comprising an inner lever face;
an alignment plate;
said alignment plate comprising a medial face facing and spaced from said inner lever face;
a torque link;
said torque link having a proximally facing proximal edge;
said torque link having a distal surface facing distally;
said torque link extending between said medial face and said inner lever face;
a distal leg of said elongate lever arm extending distally past said torque link;
said distal leg having a length exceeding the length of said distal surface of said torque link;
said inner lever face, said medial face, and said proximal edge define a U-shaped proximal torque pocket that opens proximally and is operable to seat a portion of lumber therein and apply torque to induce straightening of said lumber using said elongate lever arm;
said inner lever face, said medial face, and said distal surface define a U-shaped distal torque pocket that opens distally and is operable to seat a portion of lumber therein and apply torque to induce straightening of said lumber using said elongate lever arm; and,
wherein said elongate lever arm, said torque link, and said alignment plate are inseparable.

* * * * *